(12) United States Patent
Emmons et al.

(10) Patent No.: US 7,963,441 B2
(45) Date of Patent: Jun. 21, 2011

(54) SYSTEM AND METHOD FOR PROVIDING SELF SERVICE CHECKOUT AND PRODUCT DELIVERY USING A MOBILE DEVICE

(75) Inventors: Thomas J. Emmons, Chicago, IL (US); Robert D. Mills, Chicago, IL (US); Devajit Mukherjee, Chicago, IL (US)

(73) Assignee: Sears Brands, LLC, Hoffman Estates, IL (US)

( * ) Notice: Subject to any disclaimer, the term of this patent is extended or adjusted under 35 U.S.C. 154(b) by 453 days.

(21) Appl. No.: 12/038,315

(22) Filed: Feb. 27, 2008

(65) Prior Publication Data
US 2008/0237340 A1 Oct. 2, 2008

Related U.S. Application Data

(60) Provisional application No. 60/920,063, filed on Mar. 26, 2007.

(51) Int. Cl.
*G06K 15/00* (2006.01)
(52) U.S. Cl. ........................................................ 235/383
(58) Field of Classification Search .................. 235/383, 235/385; 705/26
See application file for complete search history.

(56) References Cited

U.S. PATENT DOCUMENTS

| 5,640,193 | A | 6/1997 | Wellner |
| 5,978,773 | A | 11/1999 | Hudetz et al. |
| 5,979,757 | A * | 11/1999 | Tracy et al. .................. 235/383 |
| 6,049,835 | A | 4/2000 | Gagnon |
| 6,141,666 | A * | 10/2000 | Tobin .............................. 715/207 |
| 6,199,048 | B1 | 3/2001 | Hudetz et al. |
| 6,769,018 | B2 | 7/2004 | Gagnon |
| 6,993,573 | B2 | 1/2006 | Hunter |
| 7,024,378 | B2 | 4/2006 | Razumov |
| 7,054,832 | B1 | 5/2006 | Vallabh |
| 7,156,311 | B2 | 1/2007 | Attia et al. |
| 7,634,295 | B2 * | 12/2009 | Hayaashi et al. .......... 455/556.1 |
| 2005/0125301 | A1 | 6/2005 | Muni |
| 2007/0162350 | A1 * | 7/2007 | Friedman ......................... 705/26 |
| 2008/0082424 | A1 * | 4/2008 | Walton .............................. 705/26 |

FOREIGN PATENT DOCUMENTS

| JP | 2002-170028 A | 6/2002 |
| WO | 2001/097105 | 12/2001 |
| WO | 2002/033518 | 4/2002 |
| WO | 2006/126996 | 11/2006 |

* cited by examiner

*Primary Examiner* — Jamara A Franklin
(74) *Attorney, Agent, or Firm* — Greenberg Traurig, LLP

(57) ABSTRACT

A mobile device is provided with an information extracting application in response to a message received from the mobile device while located within retail establishment. Information that is then extracted by the mobile device from an information carrying indicia via use of the information extracting application is received from the mobile device and used to cause a display on the mobile device of a first web/wireless access protocal ("WAP") page having information related to a product, wherein the first web/WAP page includes a link activatable while the mobile device is located within the retail establishment to initiate a purchase of the product. In response to activation of the link, the mobile device is caused to display at least a second web/WAP page to allow a user to specify a payment method to be used to purchase the product to specify a method by which the product is to be checked out/picked up/delivered to the user.

12 Claims, 3 Drawing Sheets

SYSTEM AND METHOD FOR PROVIDING SELF SERVICE CHECKOUT AND PRODUCT DELIVERY USING A MOBILE DEVICE

BACKGROUND

The following relates generally to communications networks and, more particularly, relates to a system and method for providing self service checkout and product delivery using a mobile device.

In the art systems and methods for using mobile devices in connection with retail services are known. For example, PCT Published Application No. WO 02/33518 generally describes a system in which a barcode representing a URL is imprinted on a page of printed material. A scanner (which can be a web enabled cellular telephone) is used to scan the barcode and translate the barcode into the URL address. A browser of the scanner uses the URL address to connect to a web page which contains further information related to the subject matter found on the printed material. The web page may also provide for the purchase of a product or service.

US Published Application No. 2005/0125301 generally describes a system that enables a user to instantly purchase items using a camera equipped mobile device, such as a cellular telephone. To purchase an item, a user utilizes the mobile device to scan a barcode for the item as it is displayed on a video screen. The barcode information and user information is then sent to a vendor server. The vendor server utilizes the user information to authenticate the user and to look up the user's payment and account information. This information is then passed to a transaction system by the vendor server in order to complete a transaction for the item.

JP Published Application No. 2002/170028 generally describes a system that allows a user to receive an electronic coupon on a mobile device, such as a cellular telephone, by accessing the Web using the mobile device.

PCT Published Application WO 01/97105 generally describes a system in which a mobile device with a bar code scanner, such as a cellular telephone, is used to scan a barcode associated with an advertisement to access a web page having product information and/or to purchase a product via the web.

U.S. Pat. No. 7,156,311 generally describes a cellular telephone application that decodes an image of a barcode, taken with a digital camera of the cellular telephone, to obtain barcode information that is, in turn, used to access web content that is associated with the barcode information.

U.S. Pat. No. 5,640,193 generally describes a system in which a device, equipped with a scanner, is used to read marks on an object, e.g., a barcode. The device then transmits a request to a server which includes data related to the read marks and the server responds by providing to the device multimedia information about the object.

U.S. Pat. No. 6,993,573 generally describes a system in which a cell phone is used to capture an image of a barcode and the cell phone uses the image to issue a URL request. The URL request is transmitted to a server and the server returns to the cell phone an information URL. The cell phone then transmits the information URL to an information server and in response receives content that is associated with the scanned barcode.

U.S. Pat. No. 6,199,048 generally describes a system in which a device reads a "data carrier modulated with an index" (e.g., a UPC label) and which uses the index to access a pointer to a remote computer. The pointer is then used to establish communication with the remote computer.

U.S. Pat. No. 5,978,773 generally describes a system in which a device reads an indicia provided on an ordinary article of commerce (e.g., a UPC label) and which uses the indicia to retrieve a network address that has been associated with the indicia.

U.S. Pat. Nos. 6,769,018 and 6,049,835 generally describe a system in which "jump codes" are published. A published "jump code" is entered at a first Internet location and the first Internet location converts the "jump code" to a URL address.

Various systems and methods for providing retail pickup services are also known in the art. For example U.S. Pat. No. 7,024,378 generally describes a method for providing vehicle pick-up service to a customer. The method involves a customer providing ID information to an "identification and control station" upon arriving at the pick-up facility/parking lot. The ID information may be read from a card, may be provided on a purchase receipt, etc. After the customer's ID information is provided, the customer is assigned a parking space and the goods ordered by the customer are delivered to that parking space.

U.S. Pat. No. 7,054,832 generally describes a method for providing vehicle pick-up service to a customer. The method involves a customer providing ID information to a "customer detection and identification station" upon arriving at the pick-up facility/parking lot. The ID information may be read from a card, a tag, etc. or may be keyed into "an input device." Upon providing the ID information, the customer may be assigned a parking space to which the goods ordered by the customer will be delivered. Alternatively, the customer can select a parking space and provide their ID information to the "customer detection and identification station" that is associated with the parking space selected by the customer.

PCT Published Application No. WO 2006/126996 generally describes a method for providing vehicle pick-up service to a customer. The customer is assigned a PIN and, once the customer arrives at the pick-up facility, the customer enters their PIN at a pick-up portal to receive the goods that were ordered/purchased by the customer.

While the systems and methods that have been generally described above do work for their intended purposes, a need remains for a system and method that provides, among other things, self service checkout and product delivery using a mobile device.

SUMMARY

In order to address this need, described hereinafter is a system and method for providing self service checkout and product delivery using a mobile device. To this end, the system and method involves using a mobile device, such as a cellular telephone, to extract information from an information carrying indicia, such as a barcode. The information extracted from the information carrying indicia is then used to redirect a browser of the mobile device to a first web/WAP page having information related to a product, the first web/WAP page having a link that is activatable to allow for the purchase of the product. In response to activation of the link, the mobile device is caused to display a second web/WAP page that provides a means for the user to specify a method for paying for the product, such as by using an e-commerce like wallet, via a customer-service representative, etc., and a third web/WAP page that provides a means for the user to specify a method by which the product is to be picked up/checked out/delivered to the user, such as at home, in-store, at an in-car pickup facility, etc.

A better understanding of the objects, advantages, features, properties and relationships of the system and method will be obtained from the following detailed description and accompanying drawing which sets forth illustrative embodiments which are indicative of the various ways in which the principles of the system and method may be employed.

BRIEF DESCRIPTION OF THE DRAWINGS

For a better understanding of the described system and method for providing self service checkout and product delivery using a mobile device reference may be had to preferred embodiments shown in the following drawings in which.

DETAILED DESCRIPTION

Referring now to Figures, a system and method for providing self service checkout and product delivery using a mobile device is hereinafter described. As will become apparent, the system and method provides for a user to utilize a mobile device to obtain information from various forms of information carrying indicia, such as a barcode, to, among other things, purchase a product and/or service and specify purchase delivery options. While the system and method will be particularly described in the context of a cellular telephone 10, it will be appreciated that the invention may be practiced using any type of mobile device having the ability to scan or photograph an image, the ability to perform network communications, and the ability to display data, such as Web/WAP pages, received via the network.

Figure 1:
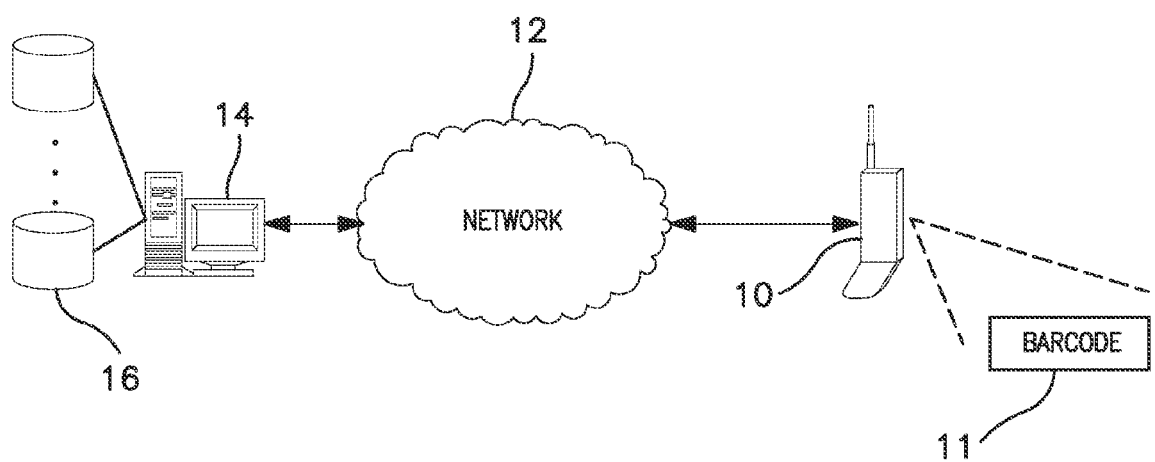
FIG. 1 illustrates an exemplary system in which the principles of the subject invention may be employed.

To facilitate use of the cellular telephone 10 within the system, generally illustrated in FIG. 1, the cellular telephone 10 includes a means to obtain information from the information carrying indicia 11. To this end, the cellular telephone 10 may include, for example, conventional barcode scanner technology or a camera and associated image processing technology as described in U.S. Pat. No. 7,156,311. Still further, the cellular telephone 10 may include convention RFID reading technology. Thus, it will be appreciated that the information carrying indicia 11 may include any form of machine-readable code having either a public standard encoding or a proprietary encoding and the cellular telephone 10 will use the technology that is appropriate to access the information carried by the particular form of information carrying indicia that is being employed within the system.

Figure 2:
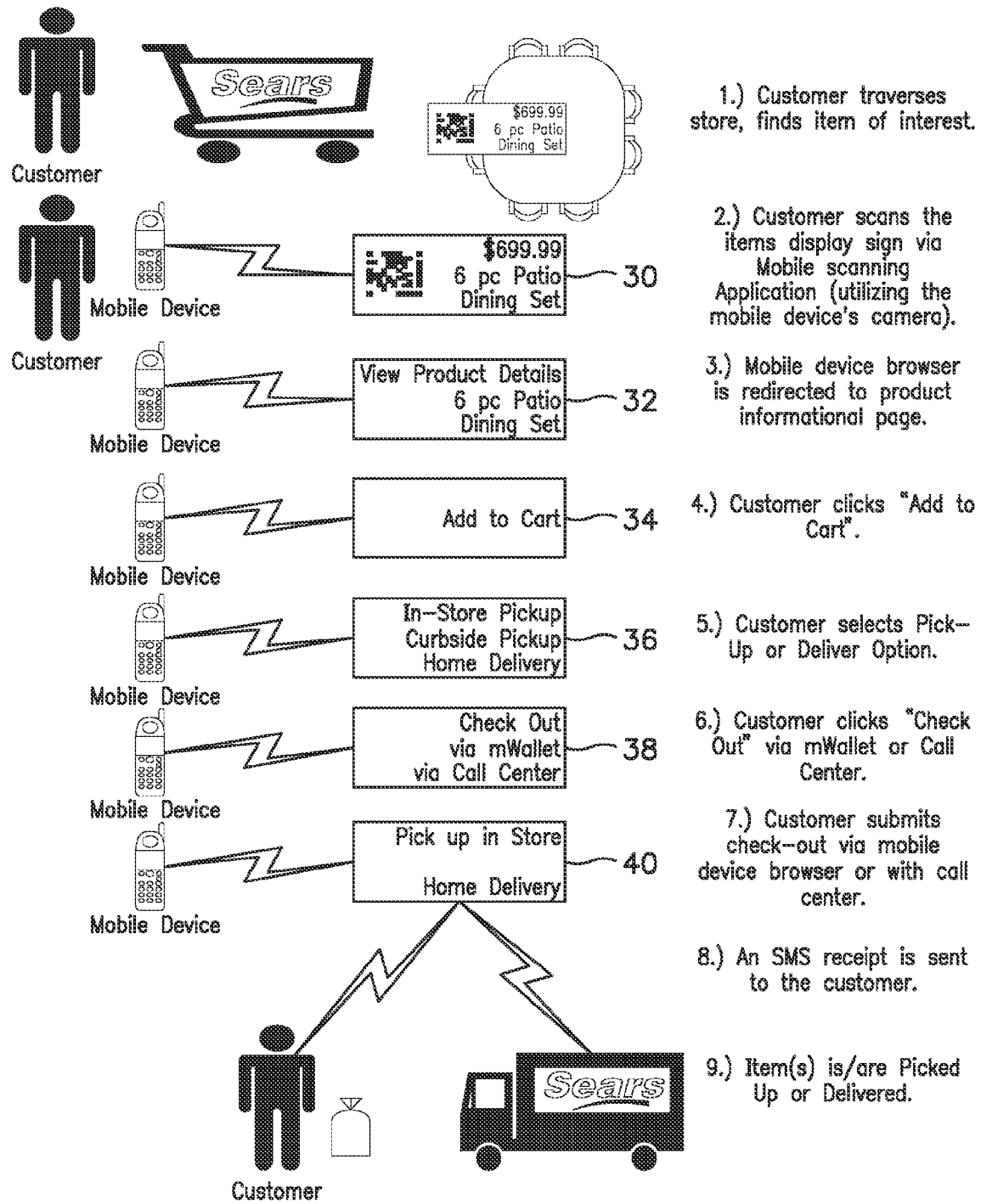
FIGS. 2-3 illustrate an exemplary method for providing self service checkout and product delivery using a mobile device.
Figure 3:
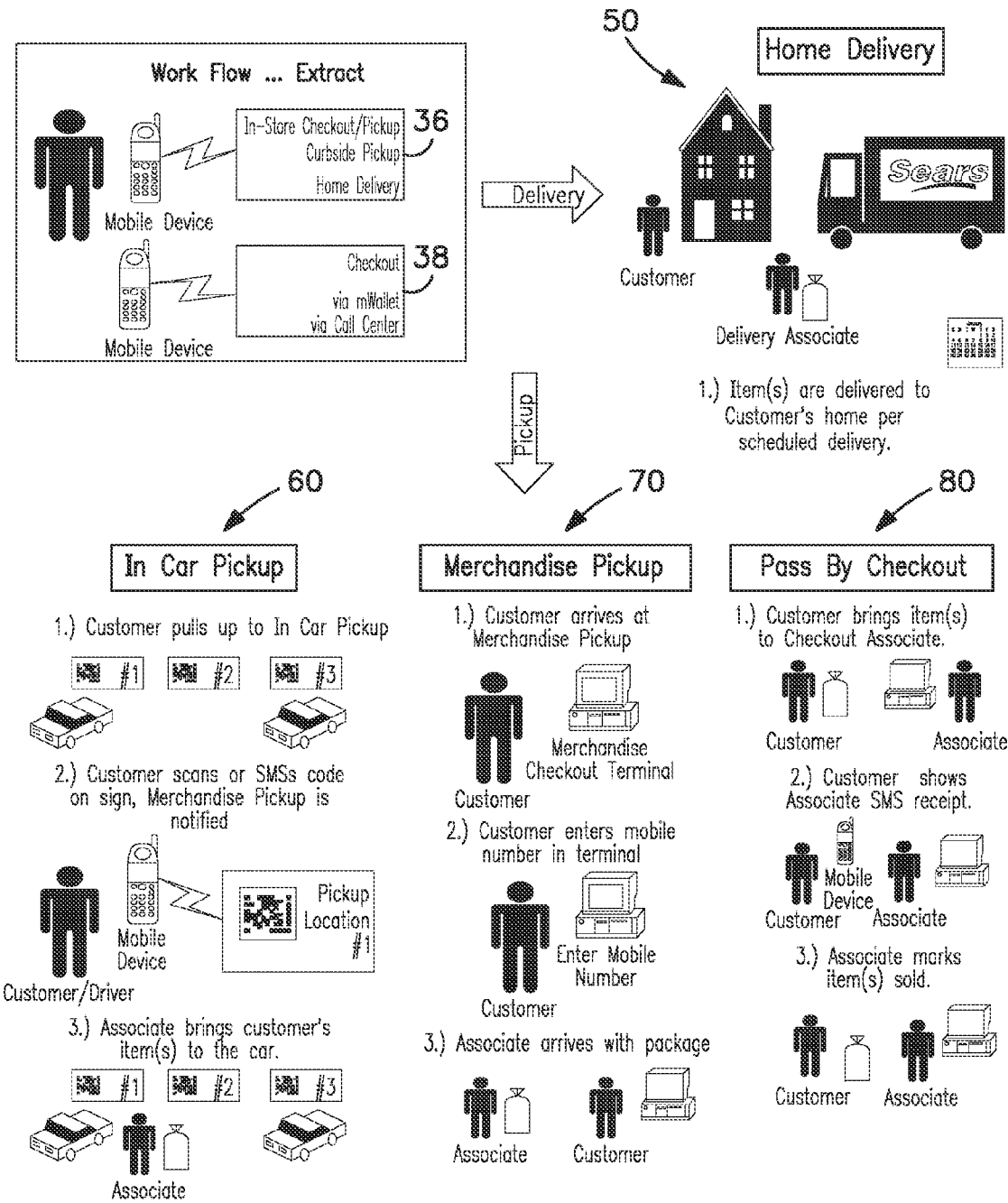

By way of particular example illustrated in FIGS. 2-3, to scan a barcode 11 a user may utilize a cellular telephone 10 having an attached or embedded digital camera. In this example, the user would launch an appropriate barcode imaging application that has been downloaded onto the cellular telephone 10 and use the digital camera to capture an image of the barcode 11. Once the barcode image 111 has been acquired by the cellular telephone 10, the barcode imaging application will function to decode the barcode to thereby extract information from the barcode. The information extracted from the decoded barcode may then be sent via a network 12 where it is routed to an appropriate server 14, having one or more associated data repositories 16, where it is further processed as discussed further below.

To provide for the downloading of a required imaging application into the cellular telephone 10 it is contemplated that a user may be presented with a display, for example within a retail establishment, on a Web/WAP page, in an SMS message, etc., which advertises the services provided by the subject invention. Within this advertising, the user could be further instructed to send a specified SMS message, for example "scan," to a specified SMS address. In response to the sending of such a message, the system may provide to the cellular telephone 10 a reply message which includes a WAP link which the user may activate, i.e., click on, to "opt-in" to the system and thereby install the imaging application upon their cellular phone 10. In connection with the installation of the imaging application upon the cellular phone 10 of the user, the system may additionally provide to the user instructions on use of the system, e.g., how to "scan" indicia that may be found on items such as price sheets, circulars, catalogs, display signs, monitors, price tags, etc. It will also be appreciated that, in certain circumstances, a required imaging application may be pre-installed on the cellular phone 10 of a user and pre-installed mobile devices may be on hand in retail outlets for the convenience of the users.

Once the cellular phone 10 of a user is setup as required to capture information from an information carrying indicia 11, the user may utilize the cellular phone to achieve various results upon encountering an information carrying indicia 11. For example, as illustrated in FIGS. 2-3, upon encountering an information carrying indicia 11 that is of interest to a user, for example a barcode that has been associated with a product at a retail establishment, the user may launch the imaging application on their cellular phone 10 and proceed to scan or capture the information carried by the information carrying indicia 11. Once the cellular phone 10 has captured the information from the information carrying indicia 11 that is of interest to the user, e.g., display 30, the system will function to use the information, for example as described in U.S. Pat. No. 7,156,311, to redirect a browser application of the cellular phone 10 to a desired Web/WAP page. In the illustrated example, the user may be first presented with a Web/WAP page 32 having information for the product that was associated with the information carrying indicia 11 that was scanned, e.g., an image of the product, availability of the product, price of the product, textual description of the product, etc. Furthermore, within the illustrated example, the Web/WAP page 30 presented to the user may be provided with further links to allow the user to send the Web/WAP page (or information related to the product) to another user, for example via email or SMS, to access price comparison information for the product, to view further information for the product or other products such as upsell products related to the product, to purchase the product, e.g., to "add to cart," etc.

In the event that user elects to purchase a product that is being viewed by the user on their cellular phone 10, for example, by the user activating the "add to cart" link 34, the system will respond by redirecting the browser application of the cellular device 10 to a further Web/WAP page which, in this example, presents to the user the contents of their shopping cart, i.e., a Web/WAP that informs the user as to the products that the user has indicated a desire to purchase. In connection with the product purchase process, the system may additionally present to the user a Web/WAP page 36 which allows the user to select a desired delivery option for the product, e.g., in store pick-up 60/70/80, home delivery 50, etc., as well as a Web/WAP page 38 which allows the user to select a desired payment option, e.g., to pay via a payment option already registered with the system (e.g., using a "M-Wallet" option), to pay via interactions with a customer service representative, etc. It will be appreciated that the Web/WAP pages 36 and 38 may be embodied on the same Web/WAP page without limitation. Once the product purchase process has been completed by the user, e.g., payment and the ability to deliver has been verified by the system using conventional methods, the system may then provide to the cellular phone 10 of the user an order confirmation (which may also indicate a time of availability for product pick-up if specified by the user as a delivery option) as well as an SMS receipt 40.

To then pick-up a purchase item if so specified by the user, the user may simply use the confirmation/receipt and/or their cell phone number in connection with a kiosk driven product pickup procedure 70 as described in, for example, U.S. Pat. No. 6,439,345. It will also be appreciated that, by providing a confirmation/receipt to the cellular phone 10 of the user, the user may be provided with an option to obtain product off the shelf 80 whereupon the user may then simply show the confirmation/receipt with the product(s) purchased to a sales associate to thereby exit the retail establishment.

In the event a user elected to pickup a purchased product using an in-car pickup process 60, the user may further use their cellular phone 10 to inform the system when they are ready for delivery of the product(s) purchased. For example, when the user arrives at the pick-up facility, the user may scan a barcode that has been affixed to a parking spot, SMS a message as directed by a sign associated with a parking spot, etc. to thereby notify the system that they are ready for product pick-up. Generally, the information provided to the system will include the parking spot in which the user is located as well as information by which the prior purchase history of the user may be accessed, e.g., the cell-phone number of the user. The system will then use the information that is provided from the cellular telephone 10 to thereby deliver to the vehicle of the user the appropriate purchased products.

While specific embodiments of the invention have been described in detail, it will be appreciated by those skilled in the art that various modifications and alternatives to those details could be developed in light of the overall teachings of the disclosure. For example, it will be appreciated that the subject system may be used in connection with a registry application, such as bridal or baby registry, where a user would populate the registry using the mobile phone scanning device and the registry would be available on-line or in-store to facilitate purchasing of items. Accordingly, the particular arrangement disclosed is meant to be illustrative only and not limiting as to the scope of the invention which is to be given the full breadth of the appended claims and any equivalents thereof.

All references discussed within this application are hereby incorporated by reference in their entirety.

What is claimed is:

1. A method for providing self service checkout to a user using a mobile device within a retail establishment, comprising:

in response to an SMS request message received from the mobile device, sending to the mobile device a reply message having a wireless access protocol ("WAP") link which is activatable while the mobile device is located within the retail establishment to initiate an installation of an information extracting application on the mobile device;

in response to the WAP link being activated on the mobile device while located within the retail establishment, providing to the mobile device the information extracting application;

receiving from the mobile device while located within the retail establishment information that was extracted by the mobile device from an information carrying indicia via use of the information extracting application installed on the mobile device, the information carrying indicia corresponding to a product being sold within the retail establishment;

using the information received from the mobile device while located within the retail establishment to cause a display on the mobile device of a first web/WAP page having information related to the product, wherein the first web/WAP page includes a checkout link activatable while the mobile device is located within the retail establishment to initiate a purchase of the product; and in response to the checkout link being activated on the mobile device while located within the retail establishment, causing a display of at least a second web/WAP page that provides a means for the user to specify a payment method to be used to purchase the product and a means for the user to specify a method by which the product is to be checked out/picked up/delivered to the user.

2. The method as recited in claim 1, comprising providing to the mobile device while located within the retail establishment at least one of an order confirmation and a purchase receipt upon completion of steps associated with purchase of the product whereupon the user is able to simply show the order confirmation or purchase receipt to thereby exit the retail establishment with the product.

3. The method as recited in claim 2, wherein at least the purchase receipt comprises the SMS message sent to the mobile device while located within the retail establishment.

4. The method as recited in claim 2, comprising providing information with at least one of the order confirmation and the purchase receipt which information is enterable into an in-store kiosk to initiate delivery or a point of sale terminal to facilitate carry out of the product.

5. The method as recited in claim 1, wherein the at least a second web/WAP page provides a means for the user to specify a method by which the product is to be delivered to the user via in-car pickup.

6. The method as recited in claim 5, comprising using the mobile device to extract information from a second information carrying indicia associated with an in-car pickup location wherein the information extracted from the second information carrying indicia is provided from the mobile device to a merchant to thereby indicate readiness of the customer to have purchased product delivered to the user.

7. The method as recited in claim 1, wherein the mobile device comprises a cellular telephone.

8. The method as recited in claim 7, wherein the information carrying indicia comprises a barcode.

9. The method as recited in claim 8, wherein the barcode comprises a 1D barcode.

10. The method as recited in claim 8, wherein the barcode comprises a 2D barcode.

11. The method as recited in claim 8, wherein the barcode comprises a 3D barcode.

12. The method as recited in claim 8, wherein the cellular telephone comprises a camera and wherein the information extracting application comprises an application that cooperates with the camera to image and extract information from the barcode.

* * * * *